Dec. 21, 1937.     C. P. HOPSON     2,102,624
AUTOMATIC TRANSMISSION
Filed March 2, 1936     3 Sheets-Sheet 1
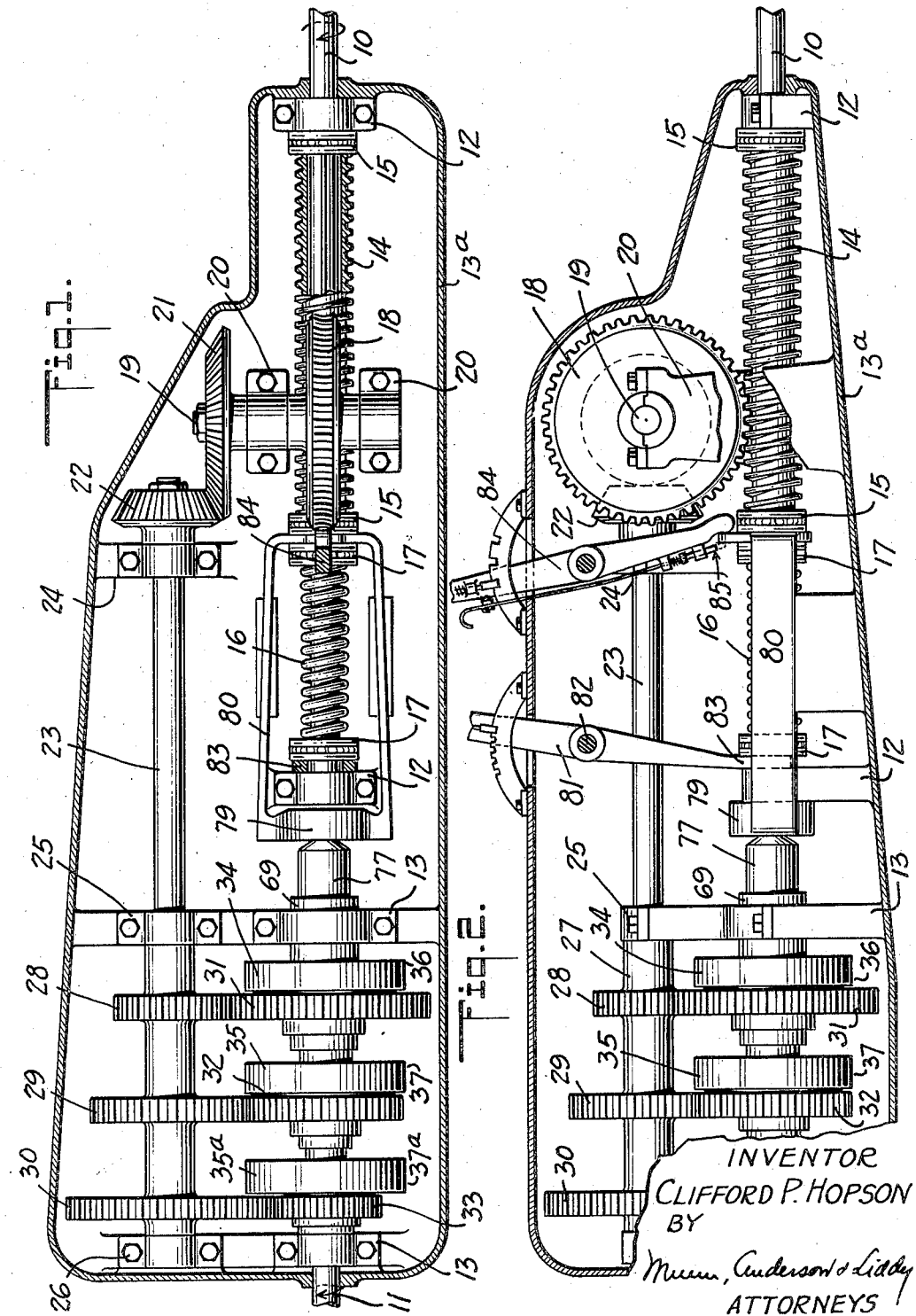
INVENTOR
CLIFFORD P. HOPSON
BY
Munn, Anderson & Liddy
ATTORNEYS

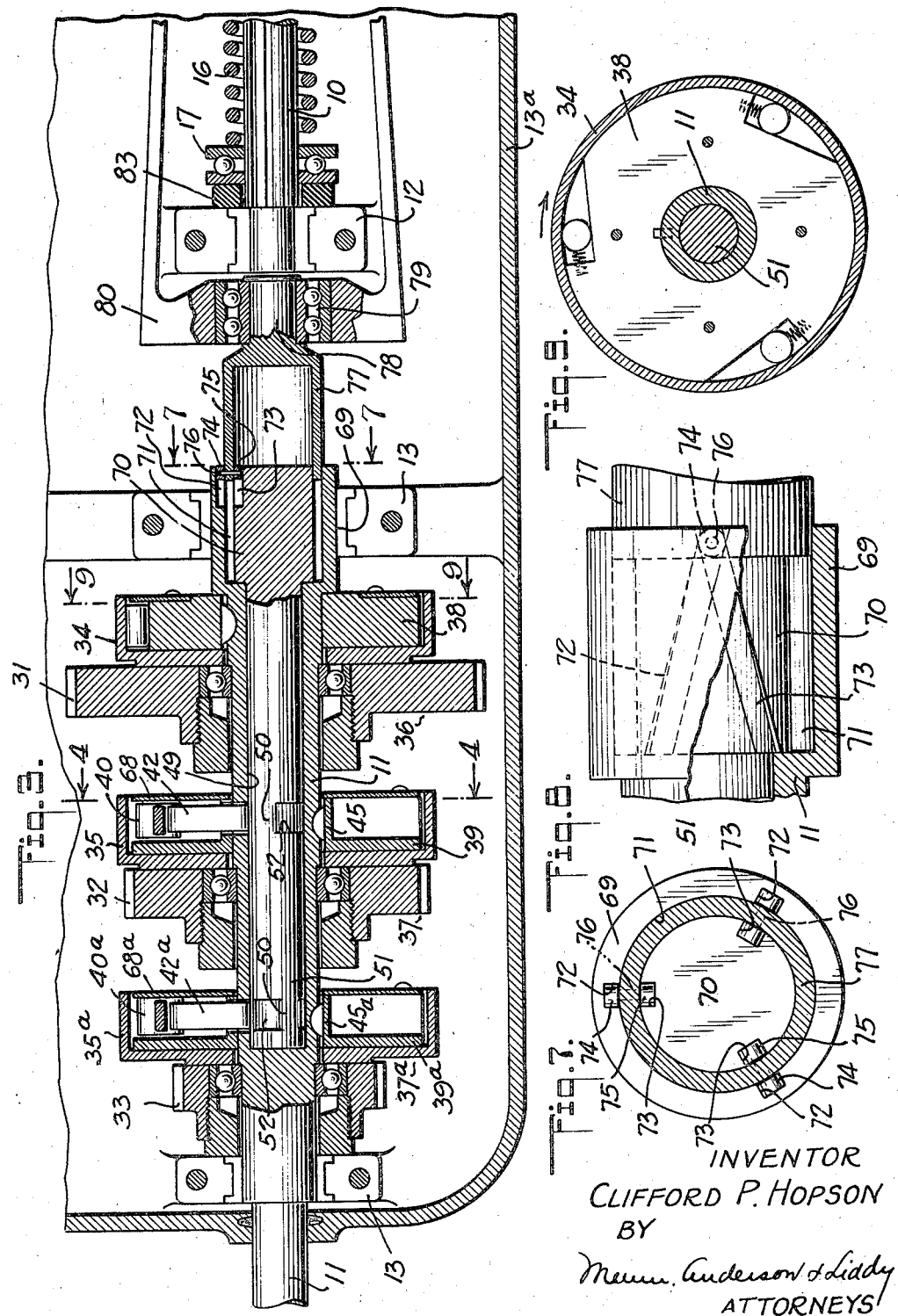

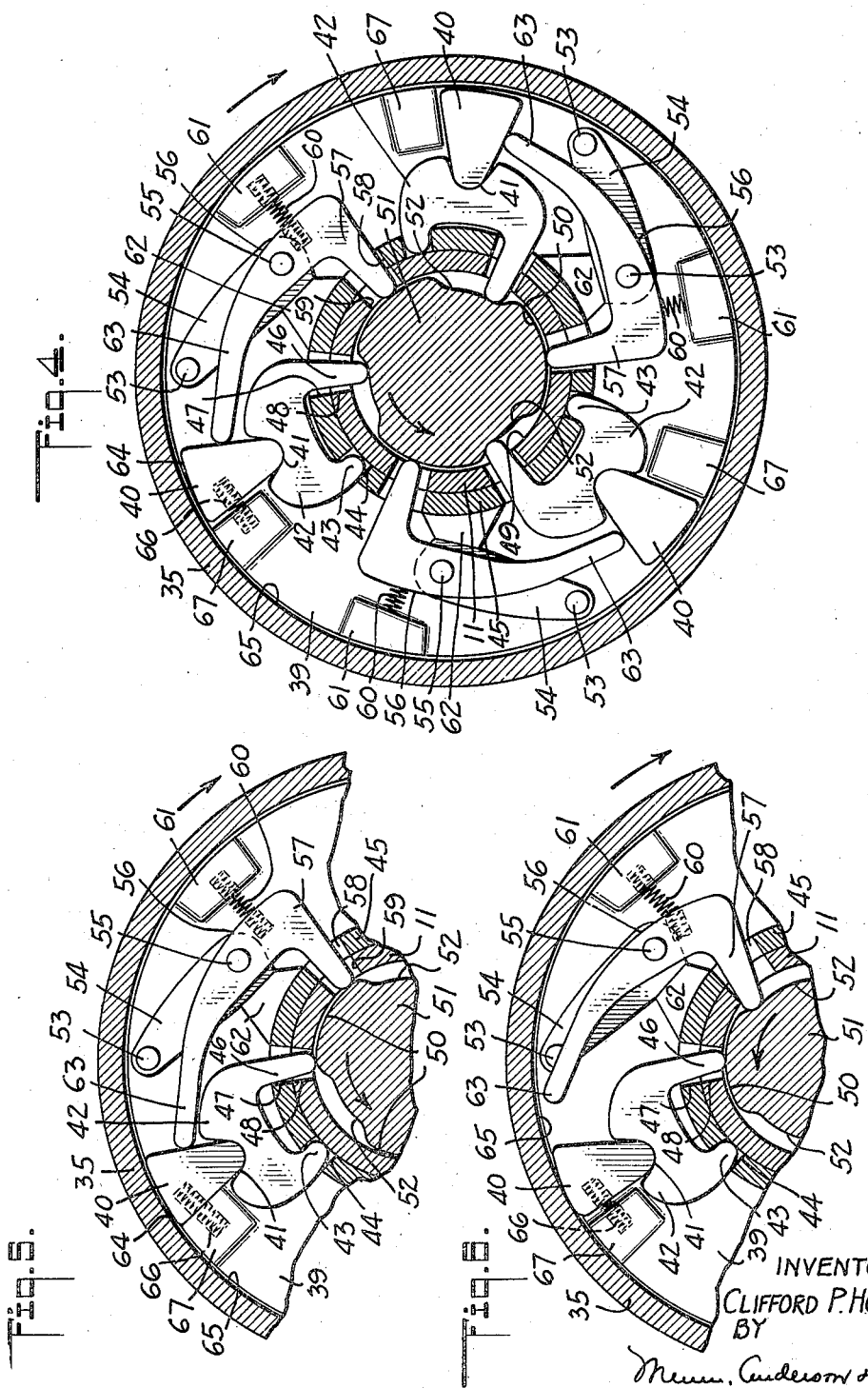

Patented Dec. 21, 1937

2,102,624

UNITED STATES PATENT OFFICE 2,102,624

AUTOMATIC TRANSMISSION

Clifford P. Hopson, Bakersfield, Calif.

Application March 2, 1936, Serial No. 66,644

8 Claims. (Cl. 74—337)

This invention relates generally to power transferring mechanism and more particularly to variable speed transmissions.

An object of this invention is to provide a variable speed transmission which is automatic in its operation to vary the speed ratio between driving and driven elements in accordance with the load or drag imposed on the driven element, and in such manner as to obtain maximum efficiency and economy from a prime mover and/or vehicle, or other apparatus with which the transmission is operatively associated.

Another object of this invention is to provide an automatic transmission of the above described character embodying means by which the effect of the load or drag in varying the speed ratio between the driving and driven elements can be manually controlled in such manner as to render the mechanism responsive to a greater load than normally required to obtain a given speed ratio in order to compensate for various operating conditions or the desires of the operator.

A further object of the invention is to provide an automatic transmission which can be manually adjusted or set to selectively provide various predetermined speed ratios irrespective of the amount of load or drag imposed on the driven element.

With these and other objects in view the invention consists in the combinations and arrangements of elements as set forth in the following specification and particularly pointed out in the appended claims.

In the accompanying drawings—

Figure 1 is a view showing in plan section one form of automatic transmission embodying this invention;

Figure 2 is a view of the automatic transmission in side elevation and with the housing thereof in section;

Figure 3 is an enlarged longitudinal sectional view illustrating overrunning clutch mechanisms and operating means therefor, embodied in the transmission;

Figure 4 is an enlarged transverse sectional view of one of the overrunning clutches in disengaged position and taken on the line 4—4 of Figure 3;

Figures 5 and 6 are fragmentary views similar to Figure 4 but showing other positions occupied by the clutches;

Figure 7 is an enlarged transverse sectional view taken on the line 7—7 of Figure 3;

Figure 8 is a fragmentary view partly in side elevation and partly in section, of the actuating means for the overrunning clutch shown in Figure 4;

Figure 9 is a transverse sectional view taken on the line 9—9 of Figure 3.

Referring specifically to the drawings, the invention in its present embodiment comprises driving and driven elements in the form of coaxially arranged shafts 10 and 11 journaled respectively in bearings 12—12 and 13—13 in a suitable housing 13a.

Splined on the shaft 10 between the bearings 12—12 is a worm 14 which abuts thrust bearings 15—15 and is normally urged axially on the shaft to the extreme position shown in Figures 1 and 2 by a heavy coil spring 16 surrounding the shaft 10 and abutting thrust bearings 17—17.

The worm 14 constantly meshes with a worm wheel 18 fixed to a transverse jack shaft 19 journaled in bearings 20—20. Fixed to one end of the shaft 19 is a bevel gear 21 constantly meshing with a pinion gear 22 fixed to a countershaft 23 disposed in parallelism with the shafts 10 and 11 and journaled in bearings 24, 25 and 26. Fixed to the countershaft between the bearings 25 and 26 is a sleeve 27 having fixed thereto or formed integral therewith gears 28, 29 and 30.

The gears 28, 29 and 30 respectively mesh constantly with gears 31, 32 and 33 to form three trains corresponding respectively to the "low", "intermediate" and "high" gears of an automobile transmission as interposed between the engine and propelling wheels of the vehicle.

The gears 31, 32 and 33 are fixed respectively to the driving members 34, 35 and 35a of overrunning clutches 36, 37 and 37a mounted on the driven shaft 11 between the bearings 13—13. The clutch 36 is of the conventional roller and wedge type shown in Figure 9, and the clutches 37 and 37a are of the identical and novel construction shown in Figures 4, 5 and 6.

The driving members 34, 35 and 35a of the respective clutches are journaled to freely rotate on the shaft 11, whereas the driven members 38, 39 and 39a respectively of these clutches are keyed to the shaft in order that power from the shaft 10 can be transmitted to the shaft 11 through any one of the clutches in the manner to be later described.

The clutches 37 and 37a are adapted for automatic operation in accordance with the load or drag imposed on the drive shaft 10. These clutches and the mode of operating them will now be described, and as the clutches are identical in construction a description of one will suffice for both. However, in order to distinguish like parts of the clutches from each other, the numerals designating the parts of one clutch are provided with exponents.

The clutches each comprise a plurality of dogs or pawls 40, of which three are shown in Figure 4, equally spaced circumferentially on the driven member 39 of the clutch. These dogs each tiltably seat in a recess 41 formed in a connector 42 having a rounded lug 43 at one end, seated freely in an opening 44 in the hub 45 of the driven member, and bearing upon the periphery of the driven shaft 11. At its other end each of the connectors 42 is provided with an extension 46 which passes through an opening 47 in the hub 45, and through an opening 48 in the wall of the hollow portion 49 of the shaft 11 for actuation by a concentric lobe 50 of a cam shaft 51 mounted for rocking movement in the shaft, there being a similar lobe 50 for each connector, with the lobes being separated by concentrically recessed portions 52 on which the extensions of the connectors are adapted to ride in the disengaged position of the dogs shown in Figure 4.

Adjacent each dog and pivoted at 53 on the driven member 39 is an arm 54 on which is pivotally mounted at 55 a bell crank lever 56, one leg 57 of which extends through registering openings 58 and 59 in the hub 45 and in the shaft 11 for engagement with the periphery of the cam shaft 51 under the urging action of a spring 60 seating in sockets formed in the leg 57 and in a lug 61 on the driven member. This spring also functions to urge the lever 54 into engagement with a stop lug 62 projecting from the hub 45.

In the disengaged position of the dogs 40 wherein the leg 57 of each lever 56 rides upon one of the lobes 50, the other leg 63 of the lever engages the respective dog to retain the latter in a position in which its active peripheral surface 64 is disposed concentric with respect to the internal surface 65 of the driving member 35 against the urging action of a spring 66 seating in sockets in the dog and in a lug 67 projecting from the driven member 39. A cover plate 68 is secured to the driven member 39 to enclose the clutch mechanism.

In the operation of the clutch 37, and assuming that it is disengaged as shown in Figure 4, initial rotational movement of the cam shaft 51 from this position in the counter clockwise direction indicated by the arrow will cause the lobes 50 to rock the respective connectors 42 outwardly from the recesses 52 so that the extensions 46 of the connectors rest upon the lobes as shown in Figure 5. This operation shifts the dogs 40 radially outward, but as the legs 63 of the respective bell crank levers 56 are engaging the dogs and are retaining the latter against tilting under the action of the respective springs 66, the driven member 39 will not be operatively connected to the driving member 35.

However, as this rotational movement of the cam shaft 51 is continued to the position shown in Figure 6, the lobes 50 will clear the legs 57 of the respective levers 56, permitting the latter under the action of the respective springs 60 to disengage the dogs 40. The springs 66 are now free to tilt the dogs, and as the connectors are still being maintained in their previous position by the lobs 50, the dogs will be rocked into binding engagement of their peripheral surfaces 64 with the internal surface 65 of the driving member 35. Thus with the driving member rotating in the clockwise direction shown by the arrow in Figures 4, 5 and 6, the tendency will be to maintain the dogs in binding engagement with the driving member. Hence the driven member 39 will be driven by the driving member so that the clutch operates as a single unit to correspondingly drive the shaft 11.

In the reverse operation of the clutch to restore the same to its disengaged position, the reverse rotational movement of the cam shaft 51 from the position shown in Figure 6 will cause the lobes 50 of the cam shaft to reversely rock the respective levers 56 until their legs 63 engage the respective dogs 40. However as the dogs are wedged so tight that they will not shift under the pressure of the levers 56, the springs 60 will yield, thereby permitting the levers 56 and the respective arms 54 to rock as a unit about the respective pivots 53.

Continued reverse rotational movement of the cam shaft to the position shown in Figure 4, during which the connectors 42 ride from the lobes 50 into the recesses 52, will permit the dogs to return to their non-tilted position clear of the driving member 35, thus disengaging the driven member therefrom. It is to be noted that the relative circumferential disposition of the lobes and recesses in the cam shaft, for the two clutches 37 and 37a, is such that the clutches will be engaged and disengaged successively, one clutch being maintained engaged while the other is being engaged, or vice versa.

In order to rock the cam shaft 51 and effect operation of the clutches as aforesaid, that end of the shaft 11 confronting the shaft 10 and journaled in one of the bearings 13 is enlarged in diameter to form a cylindrical sleeve 69 which freely receives the enlarged cylindrical end portion or head 70 of the cam shaft 51 so as to provide an annular space 71 between the sleeve and head. The sleeve is provided internally with a plurality of spirally arranged grooves 72, and the head is provided with an equal number of grooves 73 reversely spiralled to the grooves 71 as clearly shown in Figure 8. In the present instance the grooves are each three in number equally spaced circumferentially and are related so that when the cam shaft 51 occupies its position of rotational adjustment relative to the driven shaft 11, as shown in Figure 6, and wherein the clutches 37 and 37a are engaged, the outer ends of the grooves 72 will directly confront the corresponding ends of the grooves 73.

Working in each of the grooves 72 and 73 are rollers 74 and 75, respectively, journaled on a pin 76 mounted radially in a cup 77 formed on one end of a stub shaft 78 journaled in a bearing 79 in one end of a yoke 80, the opposite end of which freely receives the drive shaft 10 and is confined between the thrust bearings 15 and 17 so that in response to axial feeding of the worm 14 on the drive shaft against the action of the spring 16, from the extreme position shown in Figures 1 and 2, the yoke will be correspondingly moved to advance the cup 77 into the annular space 71. As the cup 77 is thus advanced, the pairs of rollers 74 and 75 coact with the respective pairs of relatively reversely spiralled grooves 72 and 73 in rotating the cam shaft 51 in a clockwise direction as viewed in Figure 6 to first disengage the high gear clutch 37a and then the intermediate gear clutch 37 during which movement of the cam shaft the cup 77 will have been fully advanced into the annular space 71.

The general operation of the automatic transmission is as follows:

Let it be assumed that the transmission is installed in an automobile and that the engine thereof is in operation, with the usual clutch of the automobile disengaged. As this clutch is engaged to apply the power of the engine to the drive shaft 10, the rotation of the worm 14 by the shaft is opposed by the load or drag imposed on the driven shaft 11 by the resistance of the automobile to movement over the road.

It is to be understood that in the normal position of the transmission shown in Figures 1 and 2, the overrunning clutches 36, 37 and 37a are engaged, as corresponds to a high gear condition of the mechanism wherein a minimum speed ratio exists between the driving and driven shafts. As the starting load is assumed to be too great to move the vehicle in high gear, the worm 14 cannot rotate the worm wheel 18 due to the excessive load upon the driven shaft 11 preventing its rotation through the high gear train 30, 33 in the direction of the arrow in Figure 1. As a result, the worm wheel temporarily functions as a nut causing the worm to be fed axially on the drive shaft by screwing its way relative to the teeth of the worm wheel. As the spring 16 is being compressed in response to such axial feeding of the worm on the drive shaft, the yoke 80 is correspondingly moved to first disengage the high gear clutch 37a.

Should the resistance of the vehicle to forward motion still be in excess of the load imposed on the spring 16 by the axial feeding of the worm, the worm continues to screw its way relative to the worm wheel, thus further compressing the spring 16 and advancing the yoke 80 until the second gear clutch 37 is disengaged.

Assuming that with the high and intermediate gear trains unlocked by the disengagement of the respective clutches 37a and 37, that the resistance of the vehicle to forward motion is now less than the loading of the spring 16, the worm wheel 18 commences to rotate and drive the shaft 11 through the low gear train 28, 31 and the overrunning clutch 36.

As the vehicle starts to move, the power applied to the drive shaft 10, plus the potential energy of the spring 16, soon exceeds the resistance of the vehicle to forward motion, thus permitting the spring 16 to exert its force in reversely shifting the worm axially on the drive shaft until the yoke 80 has been retracted sufficiently for the second gear clutch 37 to be re-engaged so that the vehicle is now being driven through the second gear train 29, 32 and the clutch 37.

As the speed of the vehicle increases with a corresponding decrease in the load imposed on the drive shaft 11, the spring 16 in an effort to equalize its loading with that of the shaft continues to expand and further reversely shift the worm axially until the yoke 80 has been retracted sufficiently for re-engagement of the high gear clutch 37a to be effected, whereby the vehicle will be driven through the high gear train 30, 33 and the clutch 37a.

It will be manifest that although the countershaft gears 28, 29 and 30 are constantly in mesh with the low, intermediate and high gears respectively of the driving members 34, 35 and 35a of the respective clutches, the shaft 11 with all the driven members of the clutches will rotate as a unit at a speed in excess of those of the driving members 34 and 35 when the mechanism is in high gear, and at a speed in excess of the driving member 34 when the mechanism is in second gear. Thus no harm to the mechanism can result from this mode of operation.

In order to vary the loading upon the shaft 11 at which the mechanism will remain in any particular gear, a manually operable lever 81 suitably pivoted at 82 and engageable by means of a yoke 83 with one of the thrust bearings 17 can be actuated to initially compress the spring 16 to a greater load than the normal load of the spring in the high gear position of the mechanism, to thus compensate for various operating conditions and variations in the gross weight of the vehicle.

Furthermore, the automatically operated yoke 80 can be shifted manually by a handle lever 84, and set in second or low gear position in order to obtain operation of the mechanism in either of these gears independent of the automatic functioning of the mechanism. The mechanism can be latched in any gear position by the provision of a manually releasable spring urged latch 85 mounted on the lever 84.

Although there has been only one form of automatic transmission described, it is to be understood that various changes and modifications may be made therein without departing from the spirit of the invention and the spirit and scope of the appended claims.

I claim:

1. An automatic transmission comprising a driving element; a driven element; and power transferring mechanism operatively connecting said elements to vary the speed ratio between the elements in accordance with the variations in load on the driven element relative to power applied to the driving element; said mechanism including a plurality of differently ratioed driving connections; a plurality of constantly meshing gears one of which is mounted on the driving element for rotation thereby to drive the other of said gears and for axial feeding from one extreme position to another on the driving element while or without driving said other of the gears; means for yieldingly resisting the axial feeding of said one of the gears; and means responsive to axial feeding of said one of the gears to render active a predetermined one of said driving connections.

2. An automatic transmission comprising a driving element; a driven element; and power transferring mechanism operatively connecting said elements to vary the speed ratio between the elements in accordance with the variations in load on the driven element relative to power applied to the driving element; said mechanism including a worm wheel; a worm constantly meshing with the worm wheel and slidably keyed on the driving element so as to rotate the worm wheel and yet be capable of axial feeding from one extreme position to another on the driving element while or without driving the worm wheel; a spring for resisting axial feeding of the worm; and clutches selectively responsive to axial feeding of the worm to render active a predetermined one of said driving connections.

3. An automatic transmission comprising a driving element; a driven element; a plurality of constantly meshing gears; means for mounting one of said gears on the driving element for rotation thereby to drive another of said gears, and for axial feeding on the driving element without driving the last mentioned gear; power transferring mechanism for operatively connecting the last mentioned gear to the driven element and including a plurality of differently ratioed gear trains by which the driven element can be driven from said last mentioned gear at different speeds relative to the speed of the driving element; means for yieldingly resisting axial feeding of said one of the gears in accordance with variations in load on the driven element relative to power applied to the driving element; and means responsive to axial feeding of said one of the gears to render active that one of the gear trains necessary to obtain a predetermined speed ratio between said elements in accordance with the load and power relationships thereof.

4. An automatic transmission comprising a driving shaft; a driven shaft; a worm wheel; a worm meshing with said wheel and splined on the drive shaft so as to be capable of rotating the worm wheel yet be feedable axially by screwing its way relative to the worm wheel without rotating the latter; power transferring mechanism for operatively connecting the worm wheel to the driven shaft and including a plurality of differently ratioed gear trains and overrunning clutches one for each train, by which the driven shaft can be driven from the worm wheel at different speeds relative to the speed of the driving element; a spring for yieldingly resisting axial feeding of the worm in accordance with variations in load on the driven shaft relative to power applied to the driving shaft, by enabling the worm to be advanced or retracted to a greater or less extent according as the load is increased or decreased; and means responsive to axial feeding of the worm for rendering active that one of the overrunning clutches necessary to obtain a predetermined speed ratio between said elements in accordance with the load and power relationships thereof.

5. An automatic transmission as embodied in claim 4, wherein said last means comprises a cam shaft for successively actuating said clutches as the cam shaft is rocked from one position to another; a reciprocably mounted member operated in response to axial feeding of the worm; and an operative connection between the cam shaft and said member by which reciprocating motion of the latter is translated into rotary motion to rock the cam shaft.

6. An automatic transmission as embodied in claim 4 wherein said last means comprises a cam shaft journaled for rocking movement in the driven shaft to successively actuate said clutches; a reciprocably mounted member operated in response to axial feeding of the worm; the driven shaft and cam shaft having correlated reversely spiralled grooves; and rollers carried by said member and working in said grooves for coaction therewith in rocking the cam shaft relative to the driven shaft upon reciprocation of said member.

7. An automatic transmission comprising a driving element; a driven element; transmission mechanism operatively connecting said elements to drive the driven element at any one of a plurality of preselected different speeds relative to the driving element; said transmission mechanism including a plurality of gears one of which is mounted on the driving element to drive another of said gears, yet is shiftable axially of the driving element and relatively to said another of the gears without driving the latter; means for normally urging said one of the gears axially to a retracted position, and operating in accordance with variations in load on the driven element relative to power applied to the driving element, to cause said one of the gears to be advanced or retracted to a greater or less extent according as the load is increased or decreased; and means coacting with the transmission mechanism and said one of the gears, by which axial feeding of the latter will cause the transmission mechanism to increase or decrease the speed ratio between the driving and driven elements according as said one of the gears is advanced or retracted.

8. An automatic transmission comprising a driving element; a driven element; transmission mechanism operatively connecting said elements to drive the driven element at any one of a plurality of preselected different speeds relative to the driving element; said mechanism including a worm and a worm wheel, the former of which is splined on the driving element to rotate the worm wheel, yet is rendered axially feedable by screwing its way relative to the teeth of the worm wheel without driving the latter; a spring normally urging the worm axially to a retracted position, and operating in accordance with variation in load on the driven element relative to power applied to the driving element to cause the worm to be advanced or retracted to a greater or less extent according as the load is increased or decreased; and means responsive to axial feeding of the worm to cause said mechanism to increase or decrease the speed ratio between said elements according as the worm is advanced or retracted.

CLIFFORD P. HOPSON.